United States Patent Office 2,781,890
Patented Feb. 19, 1957

2,781,890

CONTROL MECHANISM FOR STACKER-CONVEYER SYSTEM

Stanley M. Mercier, Bexley, Ohio, assignor to The Jeffrey Manufacturing Company, a corporation of Ohio Original application September 18, 1950, Serial No. 185,425, now Patent No. 2,734,642, dated February 14, 1956. Divided and this application April 23, 1953, Serial No. 350,595

6 Claims. (Cl. 198—124)

This invention relates particularly to the control apparatus or system for a stacker-conveyer arrangement, and an object of the invention is to provide a control system which is very comprehensive in its coverage, yet extremely flexible and which will control automatically functions of the stacker and/or associated conveyers.

A more specific object of the invention is to provide a stacker as the ultimate element of a conveyer system, which stacker is mounted for swinging movement about an upright axis by means of a tractor which carries a boom supporting mast through the intermediary of a traveling truck and in which the traction means for the tractor is controlled by movement of the truck longitudinally of the stacker boom.

A further object of the invention is to provide additional control switches operated by the above-mentioned truck so as to stop the tractor motors entirely in case a dangerous condition develops, there also being a by-pass circuit provided to operate the tractor motors independently of the disabling switches, during which operation an alarm is repeatedly given.

Other objects of the invention will appear hereinafter, the novel features and combinations being set forth in the appended claims.

This application is a division of my application Serial No. 185,425, filed September 18, 1950, now Patent No. 2,734,642, issued February 14, 1956, for Control Mechanism for Stacker-Conveyer System.

*The conveyer system and certain structural parts thereof*

Figures 1, 1B, 1C, 1E:
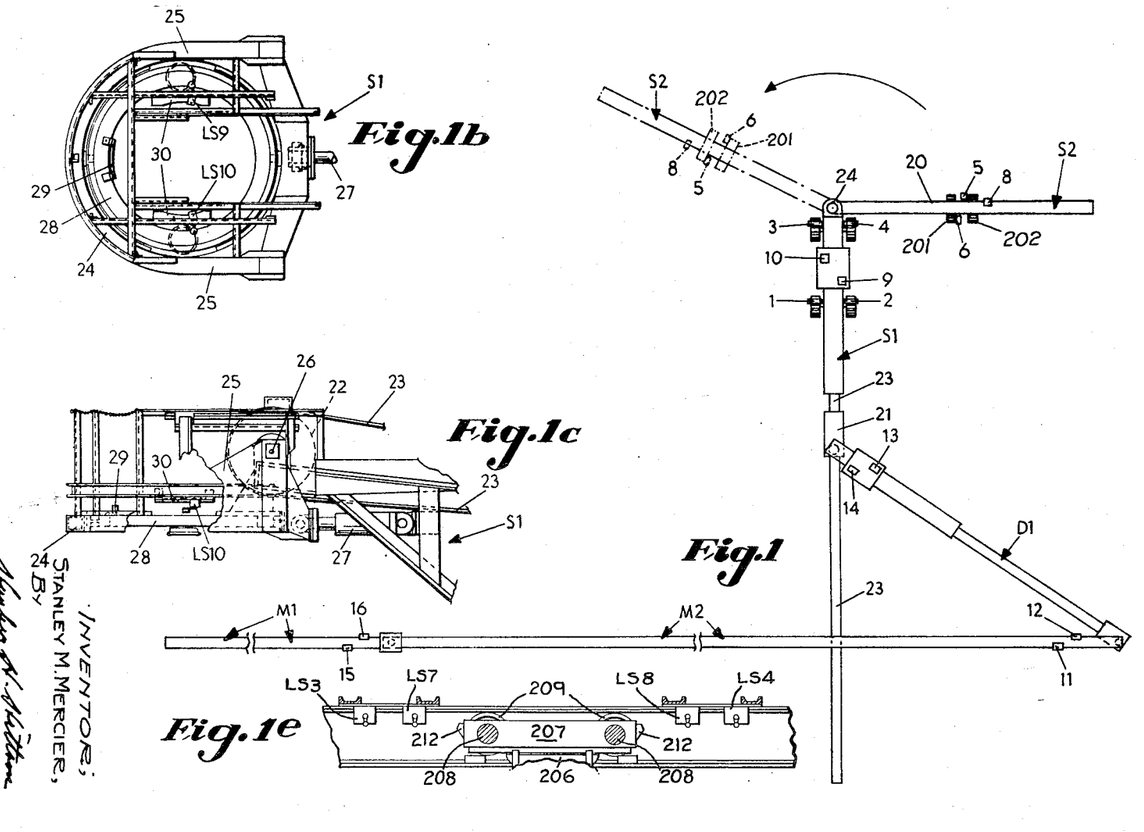
Fig. 1 is a diagrammatic plan view showing one form of stacker-conveyer system or arrangement incorporating features of my invention.
Fig. 1b is a plan view of the head portion of the head section of the trailing conveyer showing particularly the bull ring connection between said head section of the trailing conveyer and the stacker boom, together with the associated control switches.
Fig. 1c is an elevational view, with parts broken away, of the structure shown in Fig. 1b, with some additional portion of the head section of the trailing conveyer also being shown.
Fig. 1e is an elevational sectional view similar to Fig. 1d showing the relationship of the truck and the limit switches on the stacker boom.

Referring first to Fig. 1 of the drawings, there is illustrated a stacker-conveyer system incorporating features of my invention which includes a stacker 20 having a boom S2 which at its rear end is pivotally connected to the front of the head section of a trailing conveyer or what may be called a mobile conveyer designated S1. The trailing or mobile conveyer S1 is fed by a dump conveyer D1 preferably through a feed hopper 21 having the construction disclosed in the Patent No. 2,554,077, granted May 22, 1951, to Gust Weggum.

The dump conveyer D1 is preferably fed by a main line conveyer M2 which as illustrated in the drawings is in turn fed by a main line conveyer M1. The general arrangement of the stacker 20 and the head section of the trailing conveyer as well as a number of the structural features of the trailing conveyer preferably follow the disclosure of my application, Serial No. 145,501, filed February 21, 1950, now Patent No. 2,684,750, issued July 27, 1954, and my application, Serial No. 215,499, filed March 14, 1951, now Patent No. 2,642,982, dated June 23, 1953.

In addition to the structural features disclosed in said application there are certain structural features disclosed in Figs. 1b and 1c of the drawings which are significant in connection with the control system herein claimed. In Figs. 1b and 1c there is shown the front of the head section of the trailing conveyer S1 including the head pulley 22 and associated conveyer belt 23. As previously mentioned, the rear end of the stacker boom S2 is supported from the front end of the trailing conveyer head section S1 for swinging movement about an upright axis. This is effected by mechanism disclosed in detail in my Patent No. 2,684,750, part of which is also shown in Figs. 1b and 1c. This supporting mechanism includes a circular turntable supporting frame 24 having a pair of side brackets 25 by which it is pivotally mounted on the front end of the frame of the conveyer S1 by pivot means 26 which supports the frame 24 for swinging movement on a normally horizontal transversely extending axis. Hydraulic cylinder or jack adjusting means 27 interconnects the rear of the frame 24 and the frame of conveyer S1 for swinging movement of said frame 24 on said transverse axis.

Mounted for rotation relative to the frame 24 in a generally horizontal plane is a bull ring 28 which is provided with spaced rollers, disclosed in more detail in Patent No. 2,684,750, which bull ring is rigidly attached to the rear end of the stacker boom S2, as also disclosed more in detail in said Patent No. 2,684,750.

Figure 1A:
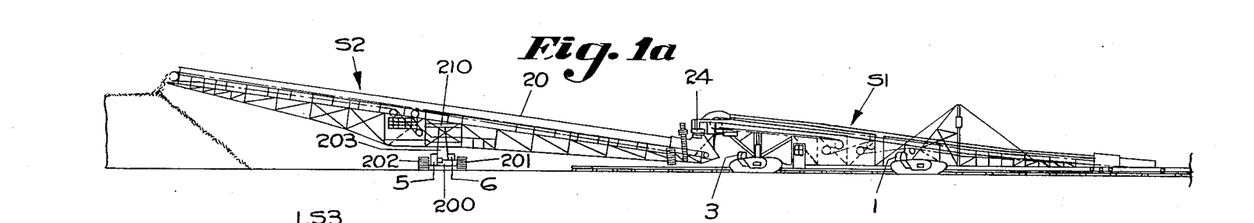
Fig. 1a is a somewhat diagrammatic side elevational view of part of the stacker-conveyor system seen in Fig. 1.

Of significance to the invention of this application is the fact that the bull ring 28 carries a limit switch operating cam 29 which, as illustrated in Fig. 1b of the drawings, is positioned as it would be with the stacker 20 extending straight forward in longitudinal alignment with the axis of the trailing conveyer section S1, as it is seen in Fig. 1a of the drawings. The frame 24 carries a pair of limit switches designated LS9 and LS10, respectively, there being one on each side of said frame 24, as clearly illustrated in Fig. 1b of the drawings. These limit switches LS9 and LS10 are adjustably mounted on supporting brackets 30 which constitute part of the frame 24, providing for adjustment of their positions so that they may be actuated by varying angular swinging movement of the boom S2 from its straight-ahead position. The functions performed by the switches LS9 and LS10 are described in connection with the wiring diagram.

Figure 1D:
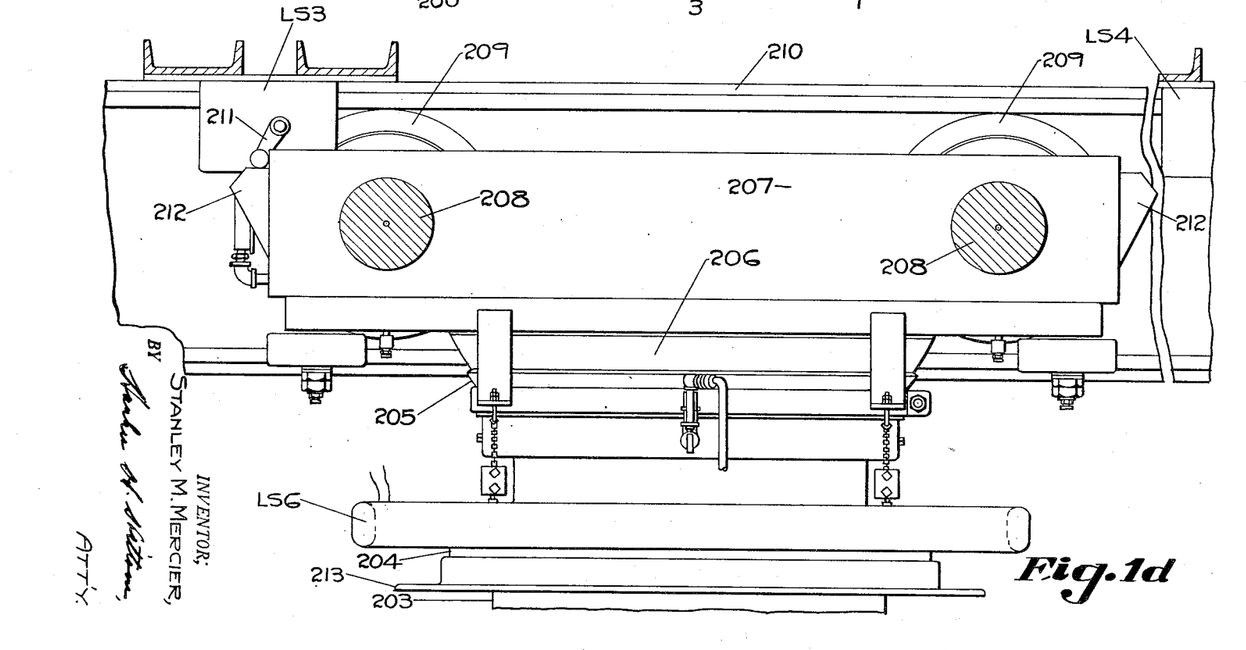
Fig. 1d is an elevational sectional view showing the connecting structure between the stacker boom and the tractor mast and including control switches operated thereby.

The boom S2 is supported and swung laterally in reverse directions by a tractor 200 which carries the boom S2 adjacent the center of its length. Tractor 200 is interconnected with boom S2 by structure shown in Fig. 1d of the drawings which structure provides for limited longitudinal or rectilinear movement between the tractor 200 and the boom S2. The tractor 200 for carrying and swinging the boom S2 is seen in Fig. 1a of the drawings and it is illustrated as of the crawler type including an inside ground engaging traction crawler 201 and a similar outside traction crawler 202. Tractor 200 also includes an elongated upwardly extending boom supporting mast, post or pedestal 203, to the upper end of which is rigidly attached a horizontal plate 204 (see Fig. 1d) and to which, in turn, there is rigidly attached a concave cup or socket 205 or what constitutes in effect a large ball and socket joint or bearing, the ball 206 of which is rigidly attached to and supports a carriage or truck 207. Carriage 207 includes laterally extending spaced axles 208 each end of each of which carries a roller 209, two of which are seen in Fig. 1d of the drawings. The four rollers 209 of carriage 207 project between opposite upper and lower flanges of a pair of laterally spaced I-beams, rails or supporting tracks 210 which form an integral part of the boom S2.

From the above description it is, of course, evident that the carriage 207 can move rectilinearly or longitudinally relative to the boom S2. It is desirable that this movement be restricted so that the carriage 207 will not get too far away from its desired position of support for the boom S2. To this end there is a pair of limit switches LS3 and LS4, one located near each end of the desired travel of the carriage 207. Limit switches LS3 and LS4 each have an operating handle or lever 211 adapted to be engaged by cams 212 on opposite ends of the carriage 207.

In view of the above described universal connection between the carriage 207 and the mast 203 it is obvious that said carriage 207 and the boom S2 which it supports are free to tilt in any direction or universally relative to said mast 203. It is evident, however, that this tilting movement should not be allowed to progress to an unreasonable extent as this might upset the tractor 200 and damage the equipment and, possibly, injure the operator. In order to give a signal or effect a control whenever the mast 203 is tilted a limited safe amount relative to the boom S2, a circular limit switch LS6 which surrounds the ball 206 and is hung from the carriage 207 is closed whenever said safe limit of tilt is reached. Since the switch LS6 per se is not pertinent to the present invention it is not described herein in detail, and reference is made to my Patent No. 2,632,558 dated March 24, 1953, for the details of its construction. Limit switch LS6 is closed upon engaging a circumferential angle 213 which surrounds and is mounted on the bottom plate 204.

*Wiring Diagram—general*

Figure 2:
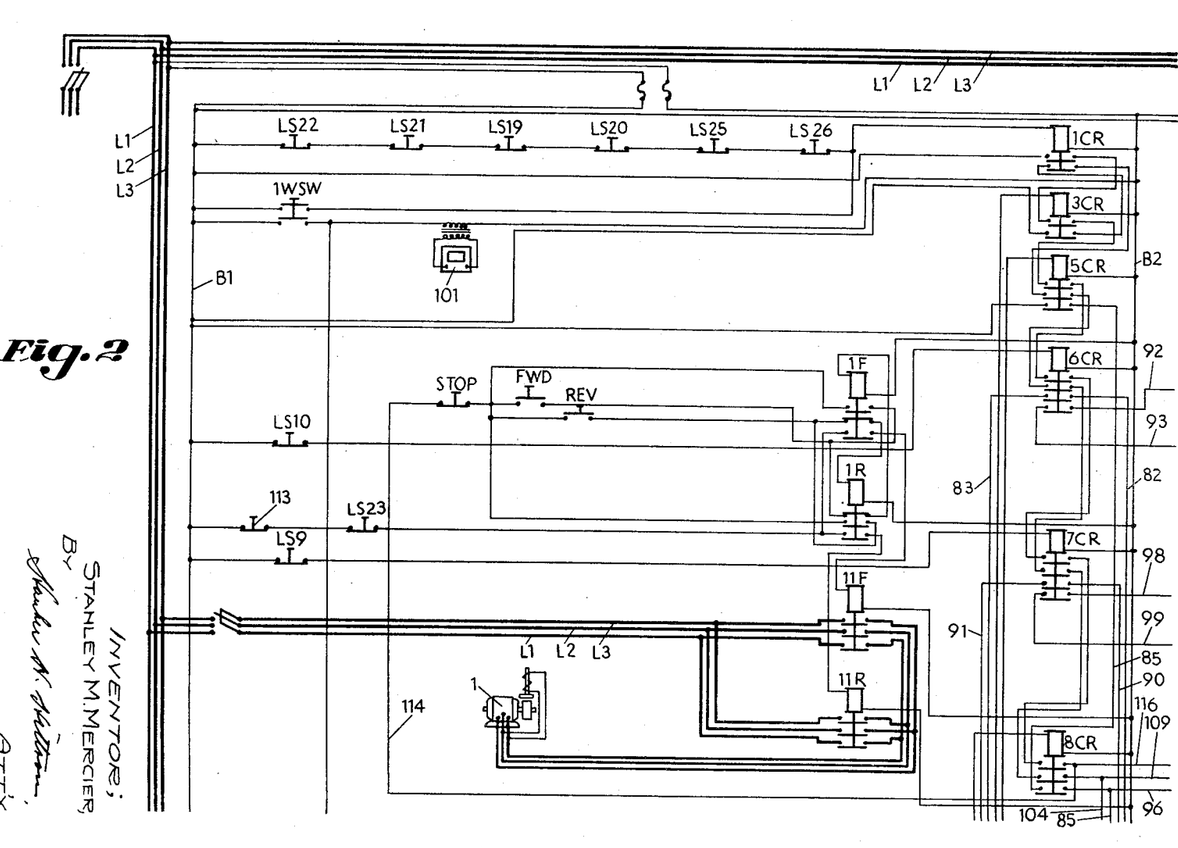
Figs. 2 to 9, inclusive, go together to make up a wiring diagram of one form of the control system embodying my invention, the complete system being illustrated by turning all the sheets of drawings sidewise and placing the even numbered drawings, one above the other, in numerical sequence, and the odd numbered drawings, one above the other, in numerical sequence, with the odd numbered drawings on the right hand side. The series starts with Figs. 2 and 3 in lateral alignment.

Figs. 2 to 9, inclusive, of the drawings, when placed as above indicated, disclose the essential portion of the wiring system including features of my invention. In general, three-phase power is supplied for the various motors and single phase power is supplied for the various control relays, solenoids, etc. The three-phase power is provided by means of three power lines L1, L2 and L3 which are connected to a primary source of power through a disconnect switch, as illustrated in Fig. 2 of the drawings. Single phase control voltage is delivered to the various relays, solenoids, etc., by means of parallel buss bars or control lines B1, B2 (Figs. 2, 4, 6 and 8), B3 and B4 (Figs. 3, 5, 7, and 9).

Figure 5:
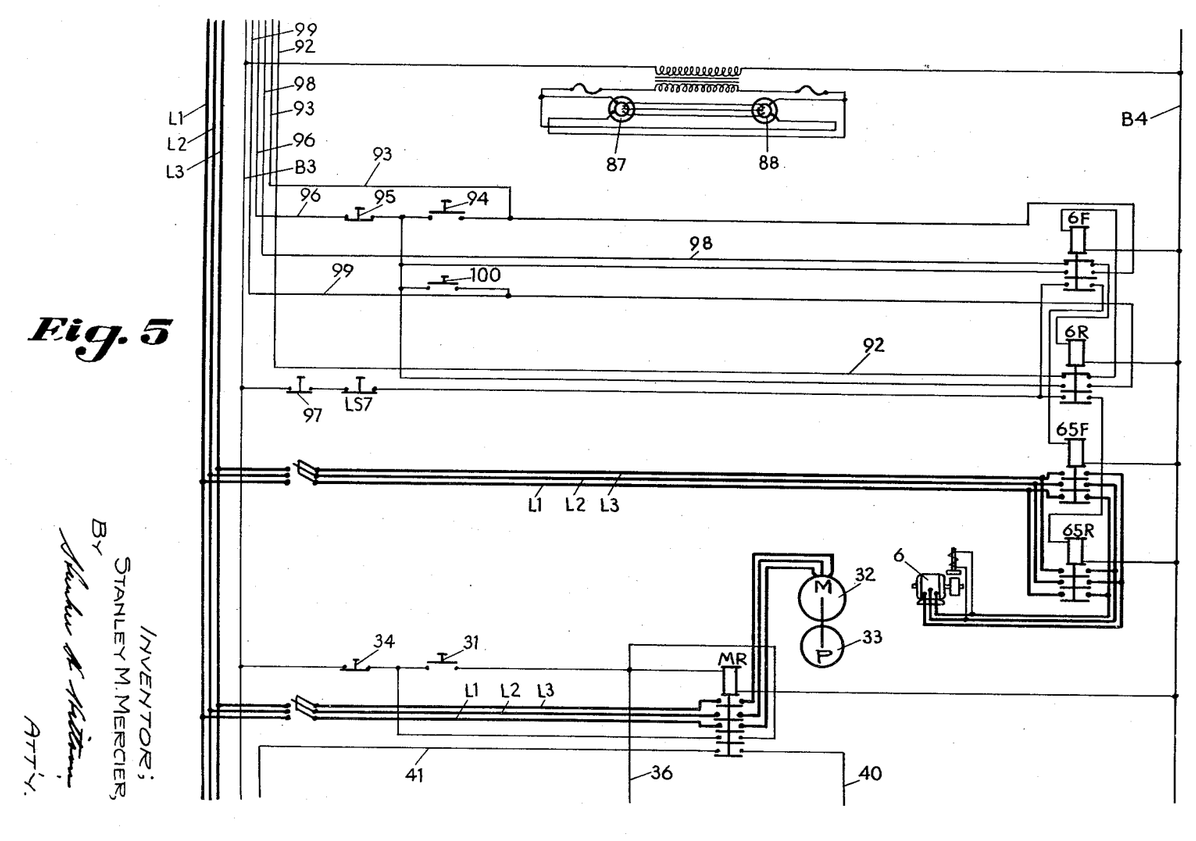

To place the stacker-conveyer in operation the first thing that is done is to close the normally open push button start switch 31 seen on Fig. 5 of the drawings. This energizes relay MR over an obvious circuit. Relay MR upon energizing closes the circuit to motor 32 which is energized from lines L1, L2 and L3 through a manual disconnect switch which will, of course, be closed when the unit is in operation. Motor 32 drives the hydraulic pump 33 of the hydraulic system which is disclosed in Fig. 10 of the drawings.

Figure 7:
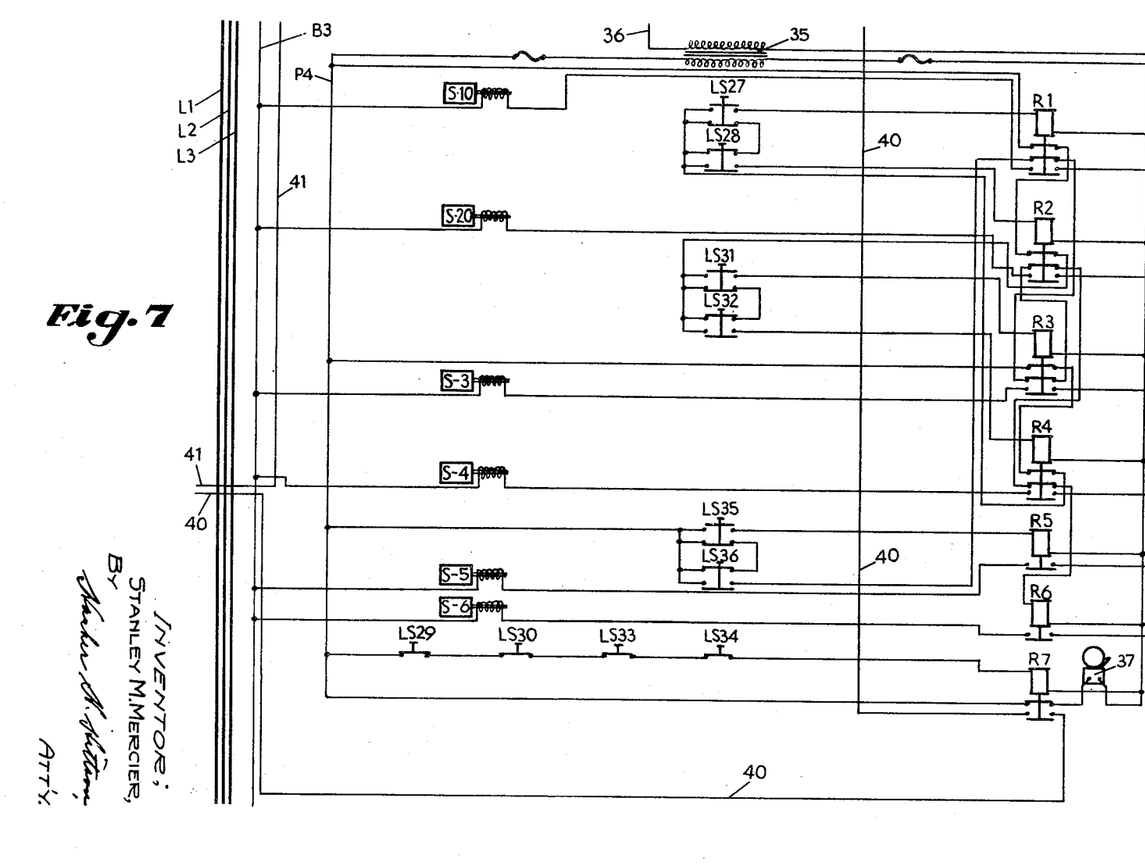

The fourth contact of the relay MR closes an obvious hold-in circuit therefor through normally closed stop switch 34. It also closes a circuit through said normally closed stop switch 34 to the primary of a transformer 35 (see top of Fig. 7) by way of a branch line or conductor 36. The secondary of transformer 35 leads to and thus energizes lines P4 and P8 (Fig. 7). The bottom contacts of the relay MR control circuits which will be described hereinafter.

Upon the energization of lines P4 and P8 (Fig. 7) relay R7 will be immediately energized, providing normally closed switches LS29, LS30, LS33 and LS34 are closed. LS29 and LS30 are the "high" and "low" control swtiches, respectively, in the transverse level control unit mounted on the front transverse bolster of the head section of the trailing conveyer. These switches correspond, for example, to the switches 54 and 55 seen in Fig. 5 of the drawings of my application, Serial No. 124,190, filed October 28, 1949, and now abandoned. They are both normally closed so long as the head section of the trailing conveyer, and consequently the stacker boom S2, are transversely level within the limits of the leveling apparatus.

Switches LS33 and LS34 are the "high" and "low" switches, respectively, of the leveling device on the turntable 24, such leveling device being shown, for example, at 26 in Fig. 2 of the drawings of my said abandoned application, Serial No. 124,190. These switches are normally closed so long as said turntable 24 is level along a plane extending longitudinally of the trailing conveyer head section S1. In other words, if the stacker boom and the turntable, as well as the head section of the trailing conveyer, are level, relay R7 will operate. If not, one of the switches LS29, LS30, LS33 and LS34 will be open, in which case relay R7 will not be energized when lines P4 and P8 are energized, in which case a bell or buzzer 37 (see Fig. 7) located in the operator's cab will be energized, indicating that one of said switches is open.

*Start and control of conveyer belts*

With relays MR (Fig. 5) and R7 (Fig. 7) closed we are now ready to start the belt of the stacker 20 by energizing the belt driving motor 8 thereof. Relay S2S (Fig. 6) is energized by closing the start switch 38 which closes the circuit through said relay which extends from energized line B2 to energized line B1 as follows: One side of the solenoid or coil of relay S2S is directly connected to line B2. The other side extends over an obvious conductor to switch 38, which is now closed, through normally closed stop switch 39 to conductor 40 which extends through the lower contacts of relay R7 (Fig. 7), then upwardly through the lower contacts of relay MR (Fig. 5). The continuation of the circuit through the lower contacts of relay MR is by conductor 41 (Fig. 5) which extends to Fig. 7 and thence to Fig. 6 through the normally closed contacts of a maintenance switch 42, thence through the normally closed contacts of an emergency stop switch 43 to the line B1. It may be stated that the emergency stop switch 43 is on the belt gangway of the boom S2 so that it can be operated to stop the belt by an operator or repairman who may be working on said gangway. The maintenance switch 42 will remain in whichever position it is thrown, but normally is in the position illustrated in Fig. 6 of the drawings.

It is obvious from the above description that conductors 40 and 41 are effectively connected together when and only when both relays MR (Fig. 5) and R7 (Fig. 7) are energized. Relay S2S on energizing closes a hold-in circuit through its upper contacts which by-passes the start switch 38 but includes the rest of the energizing circuit above described. At its second contacts relay S2S energizes relay S21 (Fig. 6), one side of the said second contacts being connected directly to line B1, the other side extending through a somewhat circuitous path to the coil of relay S21, the other side of said coil extending directly to line B2. The upper contacts of relay S21 provide a hold-in circuit therefor which extends through the second contacts of relay S2S or the second contacts of relay S2M in parallel, one side of each of which contacts is connected with line B1. Relay S21 will therefore be energized whenever relay S2S or relay S2M is energized.

Relay S21 on being energized closes the circuit to motor 8 over its lower contacts, energy from said motor being derived over obvious conductors from the lines L1, L2 and L3 under the control of a disconnect switch. The lower contacts of the relay S2S provide an interlock between this relay which controls motor 8 of the stacker 20 with the driving motor or motors of the conveyer on the head section S1 of the trailing conveyer. The relay S2S may be deenergized and thus stop the motor 8 by opening the normally closed stop switch 39 which would deenergize it and also deenergize relay S21 unless the relay S2M is energized, as now to be described.

In case it is desired to operate the conveyer belt of the boom, or, in other words, to drive the motor 8 without starting the entire system, for example, for maintenance purposes, start switch 44 is closed (Fig. 6) which energizes relay S2M, one side of which is connected directly to line B2, the circuit extending from switch 44 through the normally closed contacts of "inch" switch 45, the normally closed contacts of stop switch 46, the normally open contacts of maintenance switch 42 which are now closed, and the normally closed contacts of emergency switch 43 to line B1. The upper contacts of relay S2M provide a hold-in circuit which by-passes the start switch 44, the circuit otherwise being the same as above described. The second contacts of relay S2M are in parallel with the second contacts of relay S2S and consequently energize relay S21 in substantially the same way it was energized by said second contacts of relay S2S. This will start the motor 8 and maintain it in operation until stop switch 46 is opened to drop out relays S2M and S21.

It is also possible to energize relay S21 momentarily, and thus energize the motor 8 momentarily to "inch" it along for repair or inspection purposes by controlling said relay S21 direct. This is effected by closing the normally open contacts of "inch" switch 45 which extends the line B1 through switches 43, now closed but normally open contacts of maintenance switch 42, normally closed stop switch 46, and the lower normally open but now closed contacts of "inch" switch 45 to one side of the coil of relay S21, the other side being permanently and directly connected to line B2. Relay S21 will be energized under these circumstances only so long as the "inch" switch 45 is held with its lower contacts closed. It is, of course, evident that relay S21 controls motor 8 direct, and motor 8 will always run when relay S21 is energized, providing its disconnect switch is closed and there is power on the lines L1, L2 and L3.

As previously mentioned, the lower contacts of relay S2S (Fig. 6) provide an interlock requiring that this relay be energized and thus the belt of the stacker 20 be in operation before the belt 23 of the trailing conveyer can be started. The lower contacts of said relay S2S upon closing energize relay S1S (Fig. 8), one side of which is connected directly to line B2, the other side of which extends through normally closed contacts of a maintenance switch 47 which will stay in any position to which it is adjusted, the circuit extending through the normally closed contacts of emergency stop switch 48 to the line B1. Emergency stop switch 48 is available to an operator or maintenance man on the head section S1.

Relay S1S (Fig. 8) on energizing energizes relay S1A over an obvious circuit through its upper contacts. Relay S1A in turn energizes relay S11 over an obvious circuit. Relay S11 upon energizing energizes motors 9 and 10 or either of them alone, assuming their common disconnect switch is closed. If their individual disconnect switches are both closed both motors 9 and 10 will energize. If either of said individual disconnect switches is open, of course, the particular motor disconnected will not be energized. The two motors 9 and 10 are preferably provided for driving the belt 23. In practice one of them has been made a 125 horsepower motor, the other a 30 horsepower motor.

For maintenance purposes the maintenance switch 47 is switched from the position illustrated to one in which its lower contacts are closed. Under these circumstances relay S1M may be energized independently of relay S1S by closing the normally open start switch 49. Relay S1M has a hold-in circuit which by-passes the start switch 49 and extends through its upper contacts. Its lower contacts energize S1A over an obvious circuit. It may be de-energized by opening the normally closed stop switch 50. An "inch" switch 51 is provided similar in function to the "inch" switch 45, except, of course, it controls motors 9 and 10, while the "inch" switch 45 controls motor 8.

Figure 6:
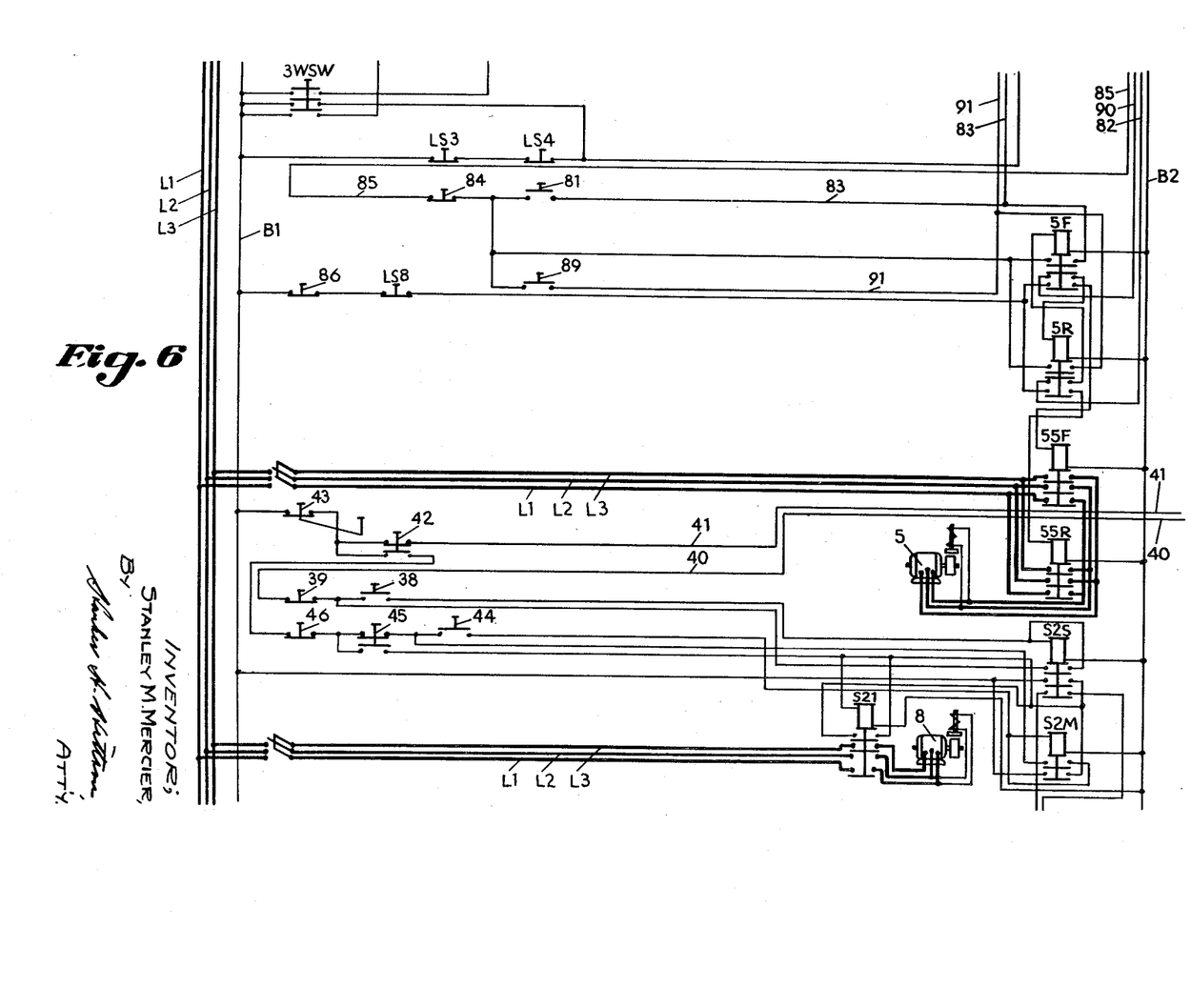
Figure 8:
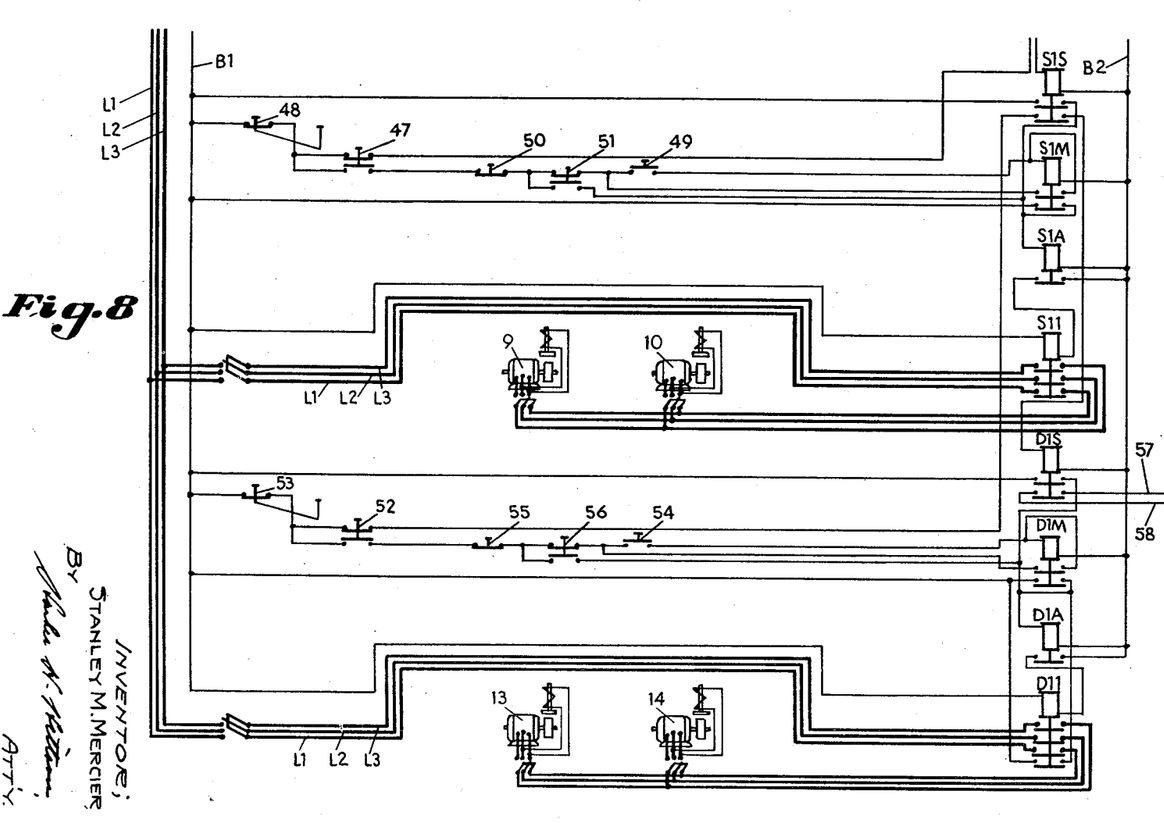

When the normally open contacts of "inch" switch 51 are closed and the maintenance switch is in the maintenance position, relay S1A will be energized over an obvious circuit so long as "inch" switch 51 is maintained closed, it, like "inch" switch 45, being the push button type and biased to the positions illustrated in Figs. 6 and 8 of the drawings. Relay S1A when energized energizes relay S11 which controls the motors 9 and/or 10 as above set forth.

The lower contacts of relay S1S (Fig. 8) provide the interlock to insure that the motors of the dump conveyer D1 start after the trailing conveyer S1 has been started. Said lower contacts of relay S1S energize relay D1S, one side of which is connected to the line B2, the other side extending through maintenance switch 52 and emergency stop switch 53 to the line B1. The upper contacts of relay D1S on closing energize relay D1A over an obvious circuit, the lower contacts extending the interlock to subsequent controls, as hereinafter described.

Relay D1A energizes relay D11 over an obvious circuit which in turn energizes the motors 13 and/or 14 in a manner obvious from the above description of the operation of motors 9 and 10. Motors 13 and 14 are the driving motors for the dump conveyer D1. In addition to the automatic interlock control of these motors, as above described, they may be operated individually and continuously by reversing the maintenance switch 52 and controlling the relay D1M through its start switch 54 and its normally closed stop switch 55, said relay D1M being provided with upper hold-in contacts which by-pass the start switch 54. The lower contacts of relay D1M energize relay D1A which in turn energize relay D11 to energize motors 13 and 14.

The "inch" control for the motors 13 and 14 is provided by "inch" switch 56 which energizes D1A direct so long as said "inch" switch 56 is closed and the maintenance switch 52 is in the maintenance position. The maintenance and "inch" controls for the relays D1A and D11 are substantially the same as those above described for relays S1A and S11.

Figure 9:
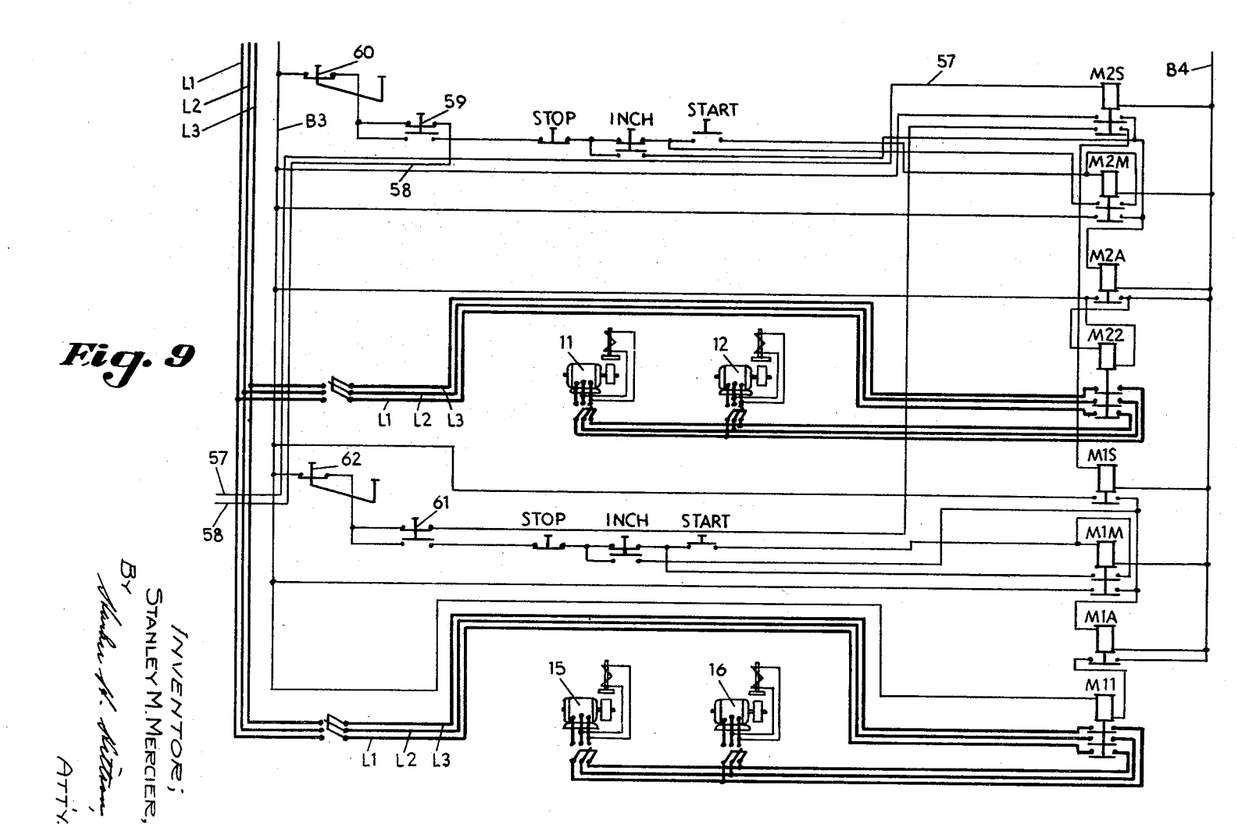

As above mentioned, the lower contacts of relay D1S (Fig. 8) provides the interlock with the controls for the motors 11 and 12 on the main line conveyer M2, said lower contacts controlling conductors 57 and 58 which extend to Fig. 9, the first leading to relay M2S, the other to the normally closed contacts of maintenance switch 59 and then to line B3 through emergency stop switch 60. One side of relay M2S is connected directly to the line B4. At its upper contacts relay M2S energizes relay M2A over an obvious circuit. Relay M2S at its lower contacts provides interlock to the driving motors 15 and 16 of main line conveyer M1, as hereinafter described.

Relay M2A on energizing energizes relay M22 which controls the motors 11 and/or 12 in a manner obvious from the above description of the control of motors 9 and 10, 13 and 14. Maintenance control relay M2M with its hold-in circuit is provided to control relay M2A and relay M2A may be directly controlled through an "inch" switch, the control being obvious in view of the above description of the operation of maintenance relays S1M and D1M.

The lower contacts of relay M2S upon energizing will energize relay M1S over an obvious circuit which includes the normally closed contacts of maintenance switch 61 and the normally closed contacts of emergency switch 62. Relay M1S on energizing energizes relay M1A over an obvious circuit which in turn energizes relay M11 over an obvious circuit which connects M1 conveyer drive motors 15 and/or 16 to the power lines L1, L2 and L3. Relay M1A may be controlled by the maintenance relay M1M provided with a hold circuit and controlled through the maintenance switch 61 and appropriate start and stop switches in a manner which is obvious in view of the above description of the control for maintenance relays S1M and D1M. Likewise, relay M1A may be controlled direct by an "inch" switch, the control being obvious in view of the above description of the mode of operation of "inch" switches 51 and 56.

From the above description it is obvious that the driving motors for the conveyers M1, M2, D1, S1 and 20 are all interlocked and during the normal operation they can only be started in the proper sequence, with each leading belt starting before a trailing belt starts. Furthermore, if any leading belt stops, all subsequent belts will stop, while all preceding belts will continue to run. Provision is made, however, in each instance for a maintenance operation of each belt independently of each other belt, but this is only a temporary condition, and the switches are so thrown that during normal operation the interlock is provided. "Inching" operation is also provided for each belt; that is, it may be "inched" or driven forward for a short distance only so long as a push button or other switch is maintained closed. This provides great flexibility of operation of the system and one in which during normal working operations the several conveyers, one feeding the other, are interlocked so that in case of any breakdown and stoppage of any belt those belts which feed it will be automatically stopped while those belts that feed from it will continue to operate and discharge material. This will prevent any building up of material on a belt in case any such belt should be stopped during operation.

It may be stated that in the interest of simplifying what is inherently a complicated circuit any overload protecting devices and signals which are not essential features or parts of the invention herein claimed have not been illustrated in the wiring diagram.

With the electrical system operated as above described the system will be in that condition wherein all of the belts or conveyers are running and it is ready to receive material any place along the main line conveyer and discharge it over the head or discharge end of the stacker 20. In other words, the conveyer system is in operation and material may be fed to the main line conveyer, such as the main line conveyer M1, in any desired manner.

*Level protective circuit*

As previously described, the limit switches LS29, LS30, LS33, LS34 (Fig. 7) are normally closed so long as the head section S1 and the turntable 24 are level. Should either become out of level in either direction and any of said switches open, relay R7 (Fig. 7) will be deenergized which will sound the alarm 37 in the cab and which at its lower contacts will break the hold-in circuit for relay S2S (Fig. 6), thus deenergizing it. Relay S2S on deenergizing will deenergize the entire system and stop all of the conveyer motors since the energization of all of these motors is dependent upon the energization of relay S2S. If this condition occurs it will be necessary to level the apparatus so that all of the switches LS29, LS30, LS33 and LS34 (Fig. 7) are closed, whereupon the belts can be started up again only by a manual operation involving the closing of start switch 38 (Fig. 6) which will re-energize relay S2S, starting up the conveyer motors in sequence as above described.

*Level control switches and valves actuated thereby*

As previously described, limit switches LS29 and LS30 (Fig. 7) are actuated by a leveling instrument on the front bolster of the head section S1. There is another and similar level measuring device mounted thereon, which follows the construction of the device 26 of my said abandoned application, Serial No. 124,190, which includes a "high" limit switch LS27 (Fig. 7) and a "low" limit switch LS28. Limit switches LS27 and LS28 are adjusted so that they respond to a lesser tilting of said bolster to actuate them than is required to actuate the corresponding limit switches LS29 and LS30, respectively.

As also previously described, limit switches LS33 and LS34 are actuated by a leveling instrument on the turntable 24. There is another and similar level measuring device mounted thereon which also follows the construction of the device 26 of my said abandoned application, Serial No. 124,190, which includes a "high" limit switch LS31 and a "low" limit switch LS32. Limit switches LS31 and LS32 are adjusted so that they respond to a lesser tilting of said turntable 24 to actuate them than is required to actuate the corresponding limit switches LS33 and LS34, respectively. In other words, limit switches LS27, LS28, LS31 and LS32 are level correcting controlling switches, while limit switches LS29, LS30, LS33 and LS34 are level controlled protecting or shut-down limit switches.

If the head section S1 gets out of transverse level enough to close limit switch LS27 (Fig. 7) its normally open contacts will be closed and energize relay R1. One side of relay R1 is connected directly to energized line P8, the other side extending, under the conditions indicated, through the closed contacts of limit switch LS27, then over an obvious conductor to the upper normally closed contacts of relay R4, then over the upper normally closed contacts of relay R3 to the line P4.

Relay R1 on energizing energizes solenoid S10 over its lower contacts. Solenoid S10 on operating controls a four-way valve 63 (Fig. 10) to expand the left-hand leveling cylinder 64. The left-hand leveling cylinder 64 will correspond with the left-hand cylinder 56 seen in Fig. 3 of my said application, Serial No. 145,501, and left-hand cylinder 56 seen in Fig. 2 of my said application, Serial No. 215,499, now Patent No. 2,642,984. The leveling action will continue until the switch LS27 (Fig. 7) is open to deenergize relay R1 and solenoid S10.

If the head section S1 gets out of transverse level in the opposite direction enough to close the normally open contacts of limit switch LS28 (Fig. 7) relay R2 will be energized over the normally closed upper contacts of relays R3 and R4, the circuit extending from lines P8 to P4. Relay R2 on energizing energizes solenoid S20 through its lower contacts over an obvious circuit. Solenoid S20 (Fig. 10) on being energized expands the right-hand leveling cylinder 64 which corresponds with the right-hand cylinder 56 shown in Fig. 3 of my said application, Serial No. 145,501, to correct the leveling of the head section S1.

The upper normally closed contacts of relays R1 and R2 provide an interlock between these relays and relays R3 and R4 so that neither of the relays R3 or R4 can operate while either relay R1 or R2 is in operation. Likewise, the upper normally closed contacts of relays R3 and R4 provide an interlock with relays R1 and R2 so that if either relay R3 or R4 is operated neither of the relays R1 or R2 can be operated.

If the turntable 24 becomes out of level in a direction sufficient to operate limit switch LS31, relay R3 will be energized over an obvious circuit including the normally closed upper contacts of relays R1 and R2. Upon being energized relay R3 will energize solenoid S3 over its lower contacts. Solenoid S3 upon being energized will actuate a four-way valve 65 (Fig. 10) to expand the leveling cylinder or jack 27 (Fig. 1b).

If the turntable 24 becomes out of level in the opposite direction an amount sufficient to close the normally open contacts of limit switch LS32, relay R4 will be energized over an obvious circuit including the upper normally closed contacts of relays R1 and R2. Relay R4 on being energized energizes solenoid S4 over its lower contacts. Solenoid S4 on being energized will control the four-way valve 65 (Fig. 10) so as to contract the cylinder or hydraulic jack 27.

As disclosed in detail in said Patent No. 2,684,750, the weight of the head section S1 is carried on the frame of the head section S1 is carried on the front axle through the two hydraulic jacks designated 56 in said application and 64 in the instant application. Automatic means are provided to adjust the jacks or cylinders 64 so as to maintain the head section frame within a predetermined range of elevation with respect to said front axle. This includes the two limit switches designated 54 in said application, Serial No. 145,501, and best seen in Fig. 9 thereof. These limit switches are designated LS35 and LS36 in this application and are seen in Fig. 7.

As said main frame reaches such an elevation as to close the normally open contacts of limit switch LS35, relay R5 will be energized over an obvious circuit which will energize solenoid S5 over an obvious circuit. Solenoid S5 upon being energized will control a four-way valve 66 (see Fig. 10) to drain hydraulic fluid from the two leveling cylinders 64 and thus lower the frame of the head section S1 until the normally open contacts of limit switch LS35 are again opened, deenergizing relay R5 and solenoid S5.

If the same frame S1 is too low relative to the front axle the normally open contacts of limit switch LS36 will close, energizing relay R6 over an obvious circuit which includes the normally closed intermediate contacts of relays R1, R3, R2 and R4, thus insuring that relay R6 is only energized when all of said relays R1, R2, R3 and R4 are deenergized. Relay R6 upon energizing energizes solenoid S6 which will control valve 66 (Fig. 10) to deliver oil under pressure to the two cylinders 64 in parallel which will raise the frame of head section S1 until the normally open contacts of limit switch LS36 are again opened.

Figure 10:
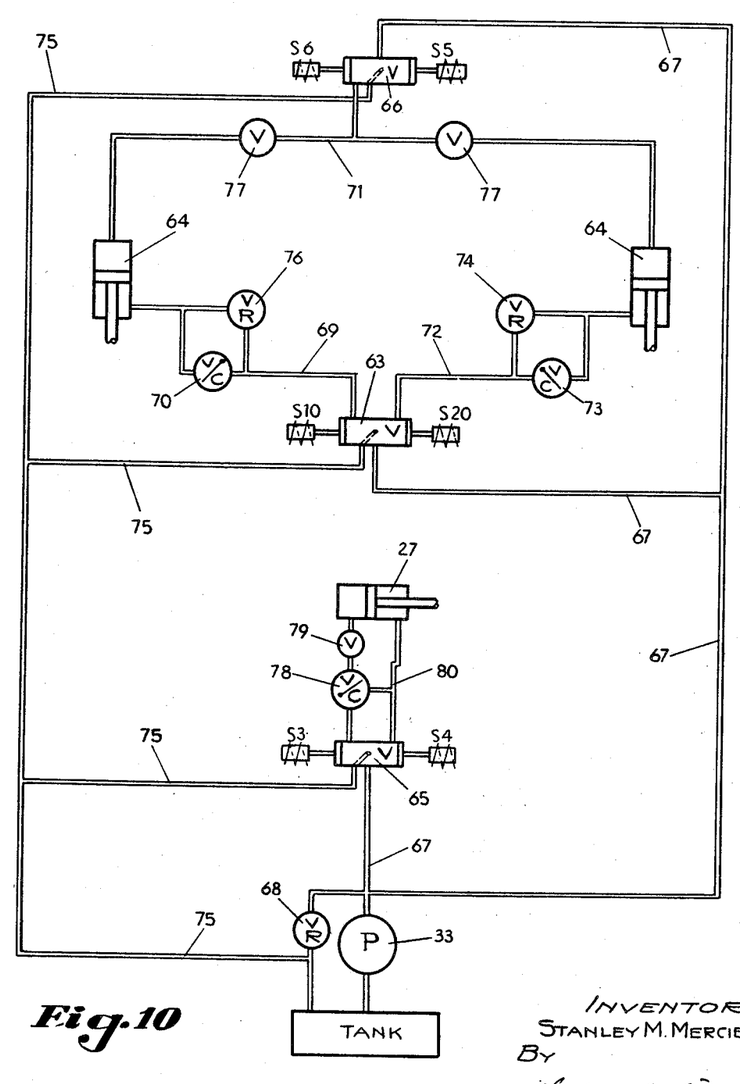
Fig. 10 is a piping diagram of the hydraulic system provided for controlling the head section of the trailing conveyer.

Attention is now directed particularly to Fig. 10 of the drawings and to the hydraulic circuit which was described in part above and which will now be described in more detail. Said hydraulic circuit includes a pump 33 which supplies hydraulic fluid under relatively high pressure to a pressure or feed line 67, also being provided with a pressure relief valve 68. When the solenoid S10 was operated as above described it functioned to deliver hydraulic fluid under pressure from the pressure line 67 to a cylinder or jack line 69 which in one branch includes a check valve 70 preventing flow of hydraulic fluid through the line 69 away from the cylinder 64, but permitting flow of said hydraulic fluid through said line 69 to said cylinder 64.

Thus when solenoid S10 is energized the leveling jack or cylinder 64 will be contracted and hydraulic fluid on the head end thereof will be forced through a line 71 to the head end of the right-hand leveling cylinder 64. Since the line 71 is blocked under these conditions by the valves 66 the hydraulic fluid will necessarily expand the right-hand leveling cylinder 64. Fluid from the piston rod side of said right-hand cylinder 64 will flow through a line 72.

Since line 72 includes a check valve 73, similar to the check valve 70, this reverse flow of hydraulic fluid cannot flow through it, but it will flow through a by-pass pressure relief valve 74. A drain line 75 will drain this reverse flow of hydraulic fluid from the valve 63 to a tank associated with the pump 33.

The check valve 70 has a pressure relief valve 76 by-passing it, the function of which is to permit reverse flow of hydraulic fluid through the line 69 when the solenoid S20 is operated. The line 71 which has parallel branches from the four-way valve 66 leading to the heads of the two leveling cylinders 64 has shut-off needle valves 77 therein which are normally open but which may be closed to prevent any seepage of fluid through the valve 66 in case the unit is shut down over-night or the like.

The relief valves 74 and 76 function to prevent wind or the like creating sufficient pressure differential between the two leveling cylinders 64 to force the head section S1 out of transverse level. However, they are set so that when hydraulic fluid is delivered to one of the lines 69 or 72 they will open to permit leveling adjustment of the cylinders 64.

If the solenoid S6 is actuated as aforesaid hydraulic fluid from the pressure line 67 will be delivered to the line 71 and expand the jacks or leveling cylinders 64. If solenoid S5 is energized as aforesaid the line 71 will be connected to the drain line 75 to drain hydraulic fluid from the cylinders 64 and lower the frame S1.

If the solenoid S3 is energized as aforesaid the valve 65 will be controlled to deliver hydraulic fluid to the head end of the cylinder 27 through a pressure operated check valve 78 and a shut-off valve 79. Shut-off valve 79 may be closed over night to prevent leakage of fluid past the valve 65 when the pump 33, for example, is idle. Check valve 78 operates to permit free flow of fluid from the pressure or feed line 67 to the head end of the cylinder 27 when solenoid S3 is energized, but normally prevents a reverse flow of fluid therethrough.

If solenoid S4 is energized hydraulic fluid will flow from the pressure line 67 through line 80 to the piston rod end of the cylinder 27. It will also supply pressure over a branch line to the check valve 78 which will open said check valve and permit the reverse flow of fluid from the cylinder 27 through the valve 65 into the drain line 75.

*Control of stacker boom swinging crawlers*

Limit switch LS6 (Fig. 4) is controlled by the angularity between the mast 203 on the tractor and the boom frame. It may, for example, follow the disclosure of my Patent No. 2,632,558, dated March 24, 1953, and be in the form of the switch 41, 42, 43 or the switch 75.

Limit switches LS3 and LS4 (Figs. 1d and 6) are controlled by reverse rectilinear travel of the truck on top of the tractor mast relative to the tractor boom and may correspond, for example, with the switches 30 seen in Fig. 3 of my said Patent No. 2,632,558.

Limit switch LS9 (Figs. 1b and 2) is operated by extreme right swing of the boom S2, and limit switch LS10 (Figs. 1b, 1c and 2) is operated by extreme left swing of the boom D2. Under normal conditions limit switches LS9 and LS10 will be closed and relays 7CR and 6CR energized over an obvious circuit.

Assuming that limit switch LS6 (Figs. 1d and 4) is closed (no undesirable tilt of tractor mast present), relay 8CR (Fig. 2) will be energized over an obvious circuit. With limit switches LS3 and LS4 (Figs. 1d and 6) closed, relay 5CR (Fig. 2) will be energized over an obvious circuit.

Under these normal conditions the system is conditioned for the operation of the two motors 5 and 6 (Fig. 1) which drive the outer and inner crawlers 202 and 201, respectively, of the tractor 200 for the stacker boom S1, which tractor may in general follow the construction of my said Patent No. 2,632,558, it being understood that each of the crawlers 201 and 202 is provided with an individual driving motor.

With relays 8CR and 5CR (Fig. 2) energized, the two crawler motors 5 (Figs. 1, 1a and 6) and 6 (Figs. 1, 1a and 5) may be energized as follows: Upon closing the forward push button switch 81 (Fig. 6) relay 5F (Fig. 6) will be energized over the following circuit: from line B2 to one side of the coil of relay 5F, thence through the normally closed intermediate contacts of relay 5R, thence by a conductor 82 across Fig. 4 to Fig. 2 over the now closed third contacts of relay 6CR, thence by a conductor 83 which extends across Fig. 4 to switch 81 which is temporarily closed, thence through stop switch 84 through conductor 85 which extends across Fig. 4 to Fig. 2 and across the now closed lower contacts of relay 8CR, thence along an extension of conductor 85 to the now closed lower contacts of relay 5CR to line B1.

Relay 5F (Fig. 6) on energizing energizes relay 55F (Fig. 6) over its lower contacts through an obvious circuit which extends through limit switch LS8 and a normally closed stop switch 86. Limit switch LS8 is operated essentially in the same manner that limit switch LS4 is operated, but it is operated prior to the operation of limit switch LS4, that is, limit switch LS8 is operated by the truck at the top of the boom tractor mast when said truck reaches a predetermined inner position relative to said boom. When this normally closed limit switch LS8 is open it disables relays 55F and 55R and makes it impossible to run motor 5 which drives the outside crawler of the boom tractor (Figs. 1 and 6). Limit switch LS8 will not ordinarily be allowed to open because the truck on top of the tractor mast which supports the boom is provided with a Selsyn transmitter, the receiver of which is placed in the operator's cab so as to indicate to the operator at all times the position of said truck relative to the longitudinal axis of said boom. This Selsyn system including a transmitter 87 and a receiver 88, which is of general standard design, is illustrated in Fig. 5 of the drawings.

Relay 5F when energized as above set forth provides a hold-in circuit through its normally open upper contacts which shunt the push button 81. Relay 55F when energized as above set forth closes an obvious circuit to the traction motor 5 for the front crawler of the boom truck, assuming that its disconnect switch is closed. This power circuit which extends to the lines L1, L2 and L3 is clearly illustrated in Fig. 6 of the drawings. To stop the motor 5 the normally closed stop button 84 is opened which de-energizes relay 5F which in turn opens the circuit and de-energizes relay 55F.

Figure 4:
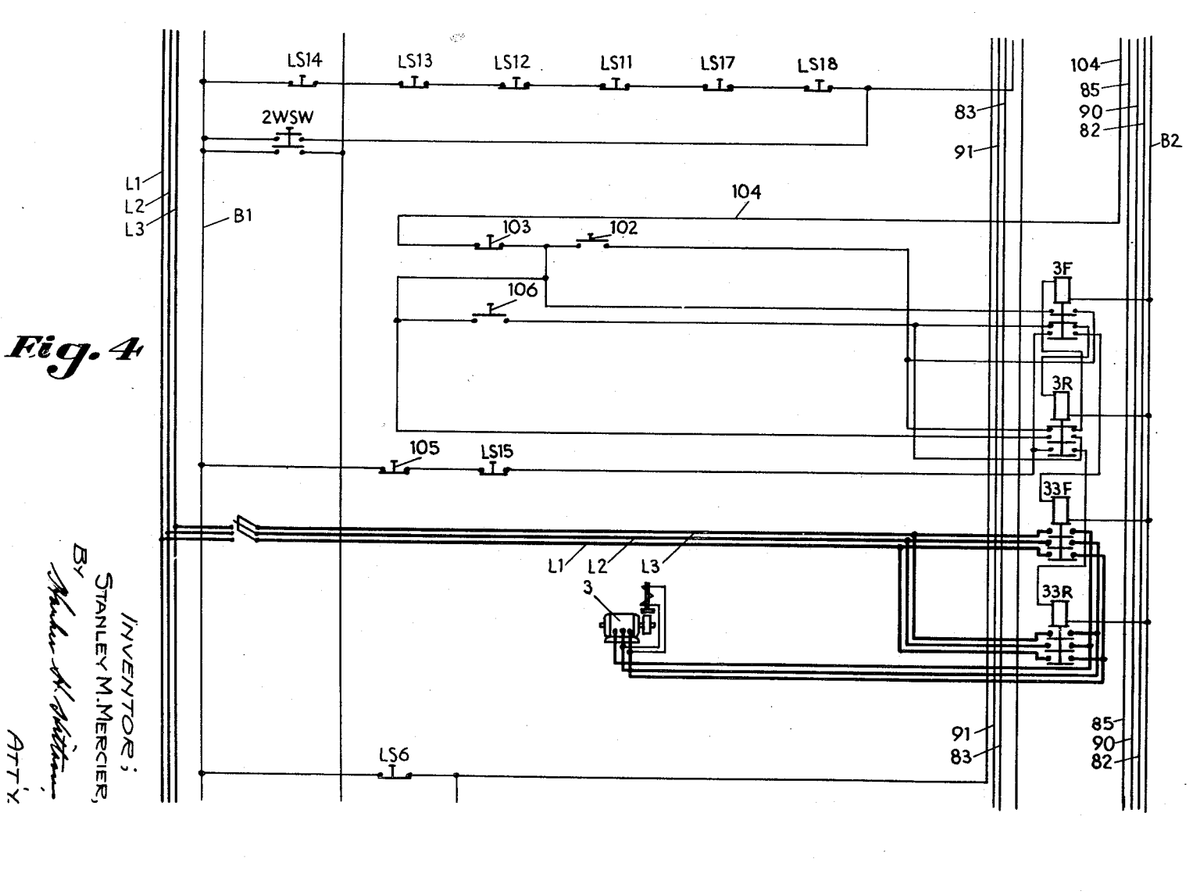

If the reverse push button switch 89 (Fig. 6) is closed, relay 5R is energized over a circuit which extends from line B2 to the coil of relay 5R, then through the intermediate normally closed contacts of relay 5F, which provides an interlock with this relay, then to conductor 90 which extends across Fig. 4 to Fig. 2 and through the now closed third contacts of relay 7R, the circuit continuing by way of conductor 91 across Fig. 4 to Fig. 6 through the momentarily closed reverse switch 89 and then to the normally closed stop switch 84 and over the circuit previously described for the operation of relay 5F. Relay 5R closes a hold-in circuit which by-passes the switch 89, the hold-in circuit including its upper contacts. At its lower contacts relay 5R close an obvious circuit to motor reversing relay 55R through limit switch LS8 and stop switch 86.

Reversing relay 55R reverses the connections to the motor 5 as compared with those of relay 55F to drive the front tractor crawler in the reverse direction. It may be noted that if limit switch LS8 should be actuated it will drop out relay 55F or 55R, whichever is energized, without releasing relay 5F or 5R.

Figure 3:
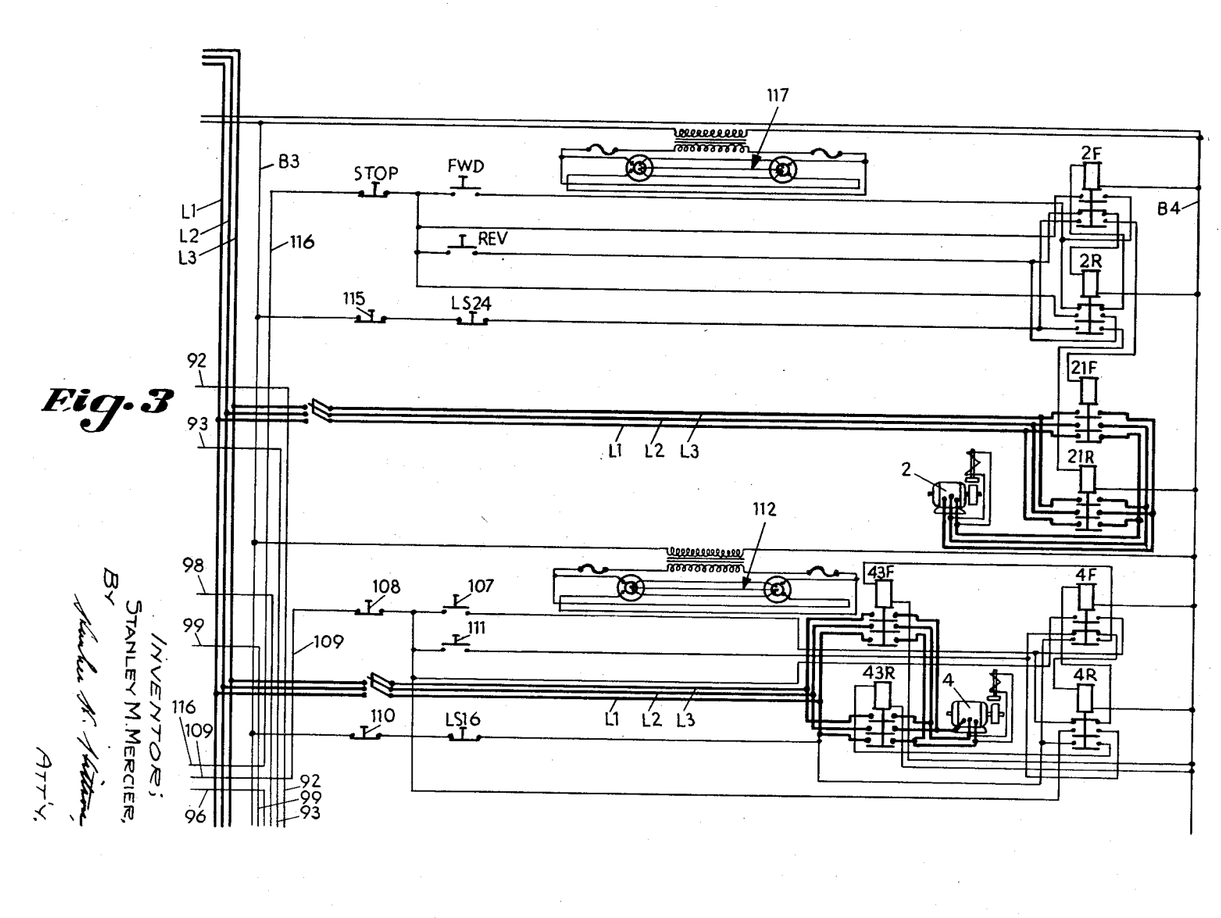

To start the crawler motor 6 for the inner crawler of the stacker tractor (Fig. 1 and Fig. 5) relay 6F (Fig. 5) is energized over a circuit which extends from line B4 to the coil thereof, then through the normally closed interlocking upper contacts of reversing relay 6R to conductor 92 which extends across Fig. 3 to Fig. 2 to the now closed lower contacts of relay 6CR (Fig. 2), then by conductor 93 which extends across Fig. 3 to Fig. 5, then through forward push button switch 94 (Fig. 5) and normally closed stop switch 95, then by conductor 96 to Fig. 3, thence to Fig. 2, across the lower contacts of relay 8CR which are now closed, thence by previously described conductor 85 through the lower now closed contacts of relay 5CR (Fig. 2), thence to the other line B1.

Relay 6F on energizing opens its normally closed upper contacts which provides the interlock with relay 6R. Its intermediate contacts upon closing provide a hold-in circuit in that they by-pass push button switch 94. The lower contacts of relay 6F energize relay 65F over an obvious circuit including limit switch LS7 and stop switch 97. Limit switch LS7 is comparable with limit switch LS8 of Fig. 6, except that it is operated when the truck 207 on top of the boom tractor mast 203 has reached its outer extreme limit. Relay 65F on energizing closes an obvious circuit to energize traction motor 6.

To effectuate reverse operation of the traction motor 6 of Fig. 5, relay 6R is energized over a circuit which extends from line B4 to the coil thereof, thence over the normally closed upper contacts of relay 6F, then by conductor 98 to Fig. 3 which extends to the now closed lower contacts of relay 7CR (Fig. 2). Conductor 99 extends from said contacts to Fig. 3, then through the reversing switch 100, then through stop switch 95 to conductor 96 which is connected to a line B1 as above described.

Relay 6R on energizing opens its upper interlocking contacts for relay 6F. Its intermediate contacts close to provide a hold-in by-pass circuit for the reversing switch 100. Its lower contacts close to energize reversing relays 65R over an obvious circuit including limit switch LS7 and stop switch 97.

*Boom limit switches, etc.*

Limit switch LS10 (Figs. 1b, 1c and 2) is opened only when the boom S2 reaches its extreme left-hand position as viewed in Fig. 1. When closed as it normally is it energizes relay 6CR (Fig. 2) direct. When open, relay 6CR drops out and prevents energization of relays 5F (Fig. 6) and 6F (Fig. 5), thus preventing forward movement of either of the motors 5 or 6 (Figs. 6 and 5, respectively). It does not prevent reverse movement of these motors.

Limit switch LS9 (Figs. 1b and 2) controls relay 7CR direct. Said limit switch LS9 is closed unless the boom S2 has reached its extreme right position of swing, as viewed in Fig. 1. When relay 7CR is de-energized, relays 5R (Fig. 6) and 6R (Fig. 5) cannot be energized, and reverse movement of the motors 5 and 6 is prevented. Forward movement of said motors is not affected by this limit switch.

Limit switch LS6 (Fig. 4), which is controlled by the truck pedestal tilt, controls relay 8CR (Fig. 2) direct.

Relay 8CR when energized disables relays 5F and 5R (Fig. 6) and 6F and 6R (Fig. 5), making all normal operation of the motors 5 (Fig. 6) and 6 (Fig. 5) impossible and, in fact, making operation of the crawler motors 1, 2, 3 and 4 of the head section S1 impossible, as hereinafter described more completely.

Limit switches LS3 and LS4 (Fig. 6) are in series and are operated on opposite extreme movements of the truck on top of the tractor mast, which truck supports the boom S2. When either of these switches is opened, relay 5CR (Fig. 2) is disabled, thus preventing the energization of relays 5F or 5R (Fig. 6) or relays 6F or 6R (Fig. 5) and makes all normal operation of tractor crawler motors 5 and 6 impossible, as well as making impossible the operation of head section crawler motors 1, 2, 3 and 4 as hereinafter described.

Limit switch LS7 (Fig. 5) is controlled by the outward travel of the truck on the tractor boom mast and is engaged prior to actuation of limit switch LS3. When open it disables forward and reversing relays 65F and 65R of motor 6 of the inner crawler of the boom tractor. Limit switch LS8 (Fig. 6) is similar to limit switch LS7 but on the opposite end and it disables forward and reverse relays 55F and 55R of motor 5, thus disabling the outer crawler motor of the boom tractor.

By-pass circuits for certain limit switches

To make possible a correcting operation and thus to operate the crawler motors 5 and 6, even though the tractor mast tilt switch LS6 has been opened or either of the tractor mast truck limit switches LS3 or LS4 have been opened, I provide by-pass circuits for them. Switch 3WSW (Fig. 6) is a type of switch which when closed will remain closed until manually opened. Its upper contacts provide an obvious by-pass around limit switch LS6 (Fig. 4), thus disabling switch LS6 when by-pass switch 3WSW is closed. The intermediate contacts of switch 3WSW provide an obvious by-pass around limit switches LS3 and LS4 (Fig. 6), thus disabling them. The lower contacts of switch 3WSW close an obvious circuit to a buzzer 101 (Fig. 2) which is in the cab and which will sound whenever by-pass switch 3WSW is closed, thus giving a warning to the operator of its closed condition.

Switch 2WSW (Fig. 4) is generally similar in structure and function to switch 3WSW and when closed it provides an obvious by-pass for limit switches LS14, LS13, LS12, LS11, LS17 and LS18 at its upper contacts. At its lower contacts it energizes buzzer 101 (Fig. 2).

Switch 1WSW (Fig. 2) is generally similar to switches 3WSW and 2WSW and when closed provides an obvious by-pass for limit switches LS22, LS21, LS19, LS20, LS25 and LS26 at its upper contacts. Its lower contacts energize buzzer 101.

Control of traction motors for crawlers of head section S1 of the trailing or mobile conveyor

(a) FRONT BOLSTER LIMIT SWITCHES

Limit switches LS14 (Fig. 4), LS13, LS12, LS11, LS17 and LS18 are associated with the front bolster of the head section S1. Limit switch LS14 opens in response to excessive left tilt of the boom, and limit switch LS13 opens in response to excessive right tilt thereof. They may correspond, for example, to the left and right switches 38 seen in Fig. 6 of my applications, Serial No. 145,501, now Patent No. 2,684,750, and Serial No. 215,499, now Patent No. 2,642,984. Limit switch LS12 opens in response to excessive left slew of the front axle of the head section S1 and limit switch LS11 opens in response to excessive right slew thereof. They may correspond, for example, to limit switches 42 seen in Fig. 5 of my said application, Serial No. 145,501, and seen in Fig. 3 of my said application, Serial No. 215,499, now Patent No. 2,642,984.

Limit switch LS17 opens in response to excessive left drift of the front axle of the head section S1, and limit switch LS18 opens in response to excessive right drift thereof. They may correspond, for example, to limit switches 27 seen in Fig. 4 of my application, Serial No. 145,502, filed September 21, 1950, and now abandoned.

Assuming that all of the limit switches LS14 (Fig. 4), LS13, LS12, LS11, LS17 and LS18 are closed, relay 3CR (Fig. 2) will be energized over an obvious circuit.

(b) REAR BOLSTER LIMIT SWITCHES

Limit switches LS22 (Fig. 2) and LS21 are controlled by the left and right tilt, respectively, of the rear bolster. Limit switches LS19 and LS20 are controlled by the left and right slew, respectively, of the rear bolster. Limit switches LS25 and LS26 are controlled by the left and right drift, respectively, of the rear bolster. When all of these switches are closed, relay 1CR (Fig. 2) will be energized over an obvious circuit.

(c) TO CONTROL MOTOR 3 (FIG. 4) ON LEFT FRONT CRAWLER OF HEAD SECTION S1

To effect forward rotation of the motor 3 and associated crawler on the left front of the head section S1 (Fig. 1) the forward push button switch 102 (Fig. 4) is closed to energize relay 3F, the circuit of which extends from line B2 to the coil of said relay, then to the interlocking upper normally closed contacts of reversing relay 3R, then through now closed switch 102, normally closed contacts of stop switch 103, to conductor 104 which extends to Fig. 2 and over the intermediate contacts of relay 8CR which are now closed, the circuit extending to the second now closed contacts of relay 7CR, then to the second now closed contacts of relay 6CR, thence to the intermediate now closed contacts of relay 5CR, thence to the lower now closed contacts of relay 1CR, thence to the lower now closed contacts of relay 3CR, and then to line B1.

A hold-in circuit for relay 3F is provided through its upper contacts which by-pass the forward starting switch 102. At its lower contacts relay 3F energizes relay 33F over an obvious circuit through limit switch LS15 and a normally closed stop switch 105. Limit switch LS15 is a correcting switch operated by excessive right drift and may correspond, for example, to one of the limit switches 26 shown in Figs. 4 and 5 of my said abandoned application, Serial No. 145,502. This means that traction driving motor 3 will be de-energized in any case where the right drift of the head section S1 reaches a correcting stage. This switch is operated by a lesser amount of right drift than is required to operate the disabling right drift limit switch LS26 (Fig. 2) above described.

Relay 33F (Fig. 4) on being energized closes an obvious circuit to the crawler motor 3 when the disconnect switch leading to the power lines L1, L2 and L3 is closed. To reverse the motor 3 it is necessary first to de-energize relay 3F, for example, by opening the stop switch 103. Stop switch 105 may be used to de-energize relay 33F without de-energizing relay 3F. If relay 3F has been de-energized, as above set forth, relay 3R may be energized by closing the reversing push button switch 106, the circuit extending from line B2 to the coil of relay 3R, through the interlocking normally closed contacts of relay 3F, through the now closed contacts of switch 106, thence to the aforedescribed line 104, through stop switch 103, the circuit extending from conductor 104 as above described for relay 3F. The intermediate contacts of relay 3R provide a hold-in circuit which shunts the switch 106. Its lower contacts energize relay 33R over an obvious circuit including limit switch LS15 and stop switch 105. Relay 33R on energizing connects the motor 3 to the power lines to reverse its direction of rotation.

(d) TO CONTROL MOTOR 4 (FIG. 3) ON RIGHT FRONT CRAWLER OF HEAD SECTION S1

To effect forward rotation of the motor 4 and associated crawler on the right front of the head section S1 (Fig. 3), the forward push button switch 107 (Fig. 3) is closed to energize relay 4F, the circuit of which extends from line B4 to the coil of said relay, then to the interlocking upper normally closed contacts of reversing relay 4R, then through now closed switch 107, normally closed contacts of stop switch 108, to conductor 109 which extends to Fig. 2 where it joins with previously described conductor 104 and extends to line B1 over the contacts of relays 8CR, 7CR, 6CR, 5CR, 1CR and 3CR in the manner above described for said conductor 104.

A hold-in circuit for relay 4F is provided through its upper contacts which by-pass the forward starting switch 107. At its lower contacts relay 4F energizes relay 43F over an obvious circuit through limit switch LS16 and a normally closed stop switch 110. Limit switch LS16 is a correcting switch operated by excessive left drift and may correspond, for example, to one of the limit switches 26 shown in Figs. 4 and 5 of my said abandoned application, Serial No. 145,502. This means that traction driving motor 4 will be de-energized in any case where the left drift of the head section S1 reaches a correcting stage. This switch is operated by a lesser amount of left drift than is required to operate the disabling left drift limit switch LS25 (Fig. 2) above described.

Relay 43F (Fig. 3) on being energized closes an obvious circuit to the crawler motor 4 when the disconnect switch leading to the power lines L1, L2 and L3 is closed. To reverse the motor 4 it is necessary first to de-energize relay 4F, for example, by opening the stop switch 108. Stop switch 110 may be used to de-energize relay 43F without de-energizing relay 4F. If relay 4F has been de-energized, as above set forth, relay 4R may be energized by closing the reversing push button switch 111, the circuit extending from line B4 to the coil of relay 4R, through the interlocking normally closed contacts of relay 4F, through the now closed contacts of switch 111; thence to the aforedescribed line 109 through stop switch 108, the circuit extending from conductor 109 as above described for relay 4F.

The intermediate contacts of relay 4R provide a hold-in circuit which shunts the switch 111. Its lower contacts energize relay 43R over an obvious circuit including limit switch LS16 and stop switch 110. Relay 43R on energizing connects the motor 4 to the power lines to reverse its direction of rotation.

The front axle of the head section S1 operates the transmitter of a Selsyn system generally designated 112, the receiver of which is in the operator's cab, thus indicating to the operator the angularity between the front axle and the longitudinal axis of said head section S1. The transmitter of this system may be operated as illustrated in Figs. 5 and 9 of the drawings of my Patent No. 2,684,750, wherein a Selsyn transmitter 50 is illustrated.

*(e) CONTROL OF MOTOR 1 (FIG. 2) ON LEFT REAR CRAWLER OF HEAD SECTION S1*

On Fig. 2 of the drawings motor 1 is illustrated, which, as seen in Fig. 1, is a motor for driving the rear left-hand crawler of the head section S1. Control of this motor in reverse directions is through the relays 1F and 1R and the relays 11F and 11R controlled thereby, respectively, all through the right drift limit switch LS23 and associated stop switch 113. Since these circuits are essentially reproductions of the above described circuits for controlling motors 3 and 4, it is believed they need no special description except to note that in extending the circuit through the relays 8CR, 7CR, 6CR, 5CR, 3CR and 1CR the extension is made by way of conductor 114 (Fig. 2) which extends over the upper contacts of relay 8CR, then through the upper contacts of relay 7CR, thence through the upper contacts of relay 6CR, thence through the upper contacts of relay 5CR, thence through the upper contacts of relay 3CR, thence through the upper contacts of relay 1CR to line B1.

*(f) CONTROL OF MOTOR 2 (FIG. 3) ON RIGHT REAR CRAWLER OF HEAD SECTION S1*

On Fig. 3 of the drawings motor 2 is illustrated, which, as seen in Fig. 1 of the drawings, constitutes the driving motor for the rear right-hand crawler traction device of the head section S1. Control of this motor in reverse directions is through the relays 2F and 2R and the relays 21F and 21R controlled thereby, respectively, all through the left drift limit switch LS24 and associated stop switch 115. Since these circuits are essentially reproductions of the above described circuits for controlling motors 3 and 4, it is believed they need no special description except to note that in extending the circuit through the relays 8CR, 7CR, 6CR, 5CR, 3CR and 1CR the extension is made by way of conductor 116 (Figs. 2 and 3) which has a common terminal with conductor 114 of motor 1 at the upper contact of relay 8CR.

The rear axle of the head section S1 operates the transmitter of a Selsyn system generally designated 117, the receiver of which is in the operator's cab, thus indicating to the operator the angularity between the rear axle and the longitudinal axis of said head section S1. The transmitter of this system may be operated as illustrated in Figs. 5 and 9 of the drawings of my said Patent No. 2,684,750, wherein a Selsyn transmitter 50 is illustrated.

In the normal operation of this stacker system the trailing conveyer 23 (Figs. 1 and 1a) will be moved forward in steps in a generally rectilinear path by the traction crawlers driven by motors 1, 2, 3 and 4. This forward motion will be controlled entirely manually. The guiding of said trailing conveyer will, however, be automatic as above described. With the head section S1 stationary the boom S2 will be swung through a predetermined angle determined by the positions of the limit switches LS9 and LS10. When either of said limit switches LS9 or LS10 is operated the boom S2 may only be swung in a reverse direction. The swinging movement of the boom S2 will be under the control of the operator who controls the traction motors 5 and 6 except for the automatic operations above described.

*Certain general conditions*

In the operation of the system with the head section S1 actuated by the feeler device and associated rail and controlling limit switches, such as disclosed in my said abandoned application, Serial No. 145,502, it is intended that said correcting limit switches, such as LS15 (Fig. 4) for motor 3, and LS16 (Fig. 3) for motor 4, be actuated to effect their correcting influence on a relatively small angular movement of the associated front axle and prior to the time that the limit switches LS11 or LS12 (Fig. 4) are actuated. Where it is desired to move the stacker unit about freely rather than follow a general straight line as provided by a guiding rail, the rail controlled guiding mechanism as disclosed in my said abandoned application, Serial No. 145,502, which controls the limit switches LS15 (Fig. 4) and LS16 (Fig. 3) is preferably lifted, as illustrated for example in Fig. 2 of my said abandoned application, Serial No. 145,502, to disable the operating mechanism for limit switches LS15 (Fig. 4) and LS16 (Fig. 3). This also, of course, renders ineffective limit switches LS17 and LS18 (Fig. 4).

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A stacker system including a stacker having a boom, means mounting said stacker for swinging movement about an upright axis, a tractor for swinging said stacker including inside and outside traction devices, a mast on said tractor, a carriage on the top of said mast supporting said boom for limited rectilinear movement relative thereto, and control means operable by inward movement of said carriage relative to said boom to control the outside traction device.

2. A stacker system including a stacker having a boom, means mounting said stacker for swinging movement about an upright axis, a tractor for swinging said stacker including inside and outside traction devices, a mast on said tractor, a carriage on the top of said mast supporting said boom for limited rectilinear movement relative thereto, and control means operable by outward movement of said carriage relative to said boom to control the inside traction device.

3. A stacker system including a stacker having a boom, means mounting said stacker for swinging movement, a tractor for swinging said stacker including inside and outside traction devices, a mast on said tractor, a carriage on the top of said mast supporting said boom for limited rectilinear movement relative thereto, switch means operable by inward movement of said carriage reaching a predetermined position on said boom to disable the outside traction device of said tractor, and a by-pass circuit for said disabling switch including an alarm operable to indicate said switch has been by-passed.

4. A stacker system including a stacker having a boom, means mounting said stacker for swinging movement, a tractor for swinging said stacker including inside and outside traction devices, a mast on said tractor, a carriage on the top of said mast supporting said boom for limited rectilinear movement relative thereto, switch means operable by inward movement of said carriage reaching a predetermined position on said boom to disable the outside traction device of said tractor, and a by-pass circuit for said disabling switch.

5. A stacker system including a stacker having a boom, means mounting said stacker for swinging movement, a tractor for swinging said stacker including inside and outside traction devices, a mast on said tractor, a carriage on the top of said mast supporting said boom for limited rectilinear movement relative thereto, switch means operable by outward movement of said carriage reaching a predetermined position on said boom to disable the inside traction device of said tractor, and a by-pass circuit for said disabling switch including an alarm operable to indicate said switch has been by-passed.

6. A stacker system including a stacker having a boom, means mounting said stacker for swinging movement, a tractor for swinging said stacker including inside and outside traction devices, a mast on said tractor, a carriage on the top of said mast supporting said boom for limited rectilinear movement relative thereto, switch means operable by outward movement of said carriage reaching a predetermined position on said boom to disable the inside traction device of said tractor, and a by-pass circuit for said disabling switch.

References Cited in the file of this patent

UNITED STATES PATENTS

| | | |
|---|---|---|
| 2,371,956 | Dees | Mar. 20, 1945 |
| 2,510,163 | Wood | June 6, 1950 |
| 2,614,684 | Daniels | Oct. 21, 1952 |
| 2,632,558 | Mercier | Mar. 24, 1953 |